(12) United States Patent
Taylor

(10) Patent No.: US 7,239,727 B2
(45) Date of Patent: Jul. 3, 2007

(54) METHOD AND DEVICE FOR VERIFYING A PERSON'S IDENTITY BY SIGNATURE ANALYSIS

(75) Inventor: Wayne Taylor, Delta (CA)

(73) Assignee: Synergex Group LLC, CT (US)

(*) Notice: Subject to any disclaimer, the term of this patent is extended or adjusted under 35 U.S.C. 154(b) by 693 days.

(21) Appl. No.: 10/299,667

(22) Filed: Nov. 20, 2002

(65) Prior Publication Data

US 2003/0120933 A1    Jun. 26, 2003

(30) Foreign Application Priority Data

Nov. 20, 2001    (CA)    ................................... 2363372

(51) Int. Cl.
*G06K 9/00*    (2006.01)
(52) U.S. Cl. ........................ 382/119; 382/123
(58) Field of Classification Search ......... 382/119–124
See application file for complete search history.

(56) References Cited

U.S. PATENT DOCUMENTS

| | | | |
|---|---|---|---|
| 3,618,019 A * | 11/1971 | Nemirovsky et al. | 382/121 |
| 4,703,511 A * | 10/1987 | Conoval | 382/182 |
| 4,944,021 A | 7/1990 | Hoshino et al. | |
| 5,107,541 A * | 4/1992 | Hilton | 382/123 |
| 5,251,265 A * | 10/1993 | Dohle et al. | 382/123 |
| 5,355,411 A * | 10/1994 | MacDonald | 713/186 |
| 5,434,928 A * | 7/1995 | Wagner et al. | 382/187 |
| 5,730,602 A * | 3/1998 | Gierhart et al. | 434/155 |
| 5,892,824 A * | 4/1999 | Beatson et al. | 713/186 |
| 5,909,500 A * | 6/1999 | Moore | 382/123 |
| 6,002,783 A | 12/1999 | Obata et al. | |
| 6,163,616 A | 12/2000 | Feldman | |
| 6,182,221 B1 | 1/2001 | Hsu et al. | |
| 6,192,142 B1 | 2/2001 | Pare, Jr. et al. | |
| 6,193,152 B1 | 2/2001 | Fernando et al. | |
| 6,212,290 B1 | 4/2001 | Gagne et al. | |
| 6,213,391 B1 | 4/2001 | Lewis | |
| 6,256,737 B1 | 7/2001 | Bianco et al. | |
| 6,307,956 B1 | 10/2001 | Black | |
| 6,314,401 B1 | 11/2001 | Abbe et al. | |
| 6,327,348 B1 | 12/2001 | Walker et al. | |
| 6,335,688 B1 | 1/2002 | Sweatte | |
| 6,427,919 B1 | 8/2002 | Toda | |
| 6,430,308 B1 * | 8/2002 | Ogawa et al. | 382/119 |
| 6,494,367 B1 | 12/2002 | Zacharias | |
| 6,496,595 B1 | 12/2002 | Puchek et al. | |
| 6,505,772 B1 | 1/2003 | Mollett et al. | |

FOREIGN PATENT DOCUMENTS

WO    WO 91/06920    5/1991

* cited by examiner

*Primary Examiner*—Joseph Mancuso
*Assistant Examiner*—Hadi Akhavannik
(74) *Attorney, Agent, or Firm*—Vermette & Co.

(57) ABSTRACT

A method of verifying identity which includes recording coordinates of a reference signature which include two dimensional space coordinates x and y exerted by a writer's writing instrument on a recording medium. The method measures and records an indicium, which identifies a reference biometric within the reference signature having a selected characteristic. Next the reference biometric and the indicium are placed on a portable, readable substrate. The coordinates of an unknown signature which include two dimensional space coordinates x and y covered by a writer's writing instrument are also recorded. The method further includes reading and storing the indicium and the reference biometric in memory and using the indicium to locate an extracted biometric within the unknown signature. The extracted biometric is compared to the reference biometric to determine if they match within predetermined threshold criteria. The reading and storing or the reference biometric and indicium, the recording of the unknown signature, the location of the extracted biometric, and the comparison of the reference and extracted biometrics are all performed on-site.

17 Claims, 2 Drawing Sheets

PRIOR ART

METHOD AND DEVICE FOR VERIFYING A PERSON'S IDENTITY BY SIGNATURE ANALYSIS

FIELD

The present invention relates to a method and apparatus for verifying the identity of a person using a biometric, such as the person's signature.

BACKGROUND

In credit card transactions, a major security problem exists whenever credit card information is transmitted over the Internet or telephone lines. In addition, because of the frequency with which credit cards, passports, and other personal documents, are lost and stolen, there exists a need to correctly, quickly and reliably verify the identity of the bearers of these documents.

In a typical credit card transaction, as seen in FIG. 1, a merchant 10 transmits a credit card number, the expiry date and a purchase order over the Internet or telephone lines 12 to a verification agent 14. The agent 14 receiving this information accesses the cardholder's credit information and after comparing the latter to the purchase order amount, either accepts or rejects the transaction. If the transaction is accepted, an approval, code is transmitted back 16 to the merchant 10 via telephone line 12. Even if the transaction is accepted there is a risk that the card is stolen and is being used fraudulently. Accordingly, there is a need to be able to quickly, accurately and securely identify the bearer of the card.

Biometrics can be used to accurately verify identity, however, biometric information sent over the Internet or telephone lines can still be intercepted and subsequently utilized for fraudulent transactions.

Various approaches have been developed to identify persons by biometrics, including unique gestures such as speech and handwriting. Such speech and handwriting recognition systems perform recognition of something that moves, leaving a "trajectory" in space and time. Typical speech recognition systems match transformed speech against a stored representation. Most speech recognition systems use some form of spectral representation, such as spectral templates or Hidden Markov Models (HMMs).

Handwriting can be analyzed in real time or after it has been formed. "Real time" or dynamic recognition systems identify handwriting as a user writes, identifying such things as number of strokes, the ordering of strokes and the direction and velocity profile of each stroke. "Real time" systems are also interactive, allowing users to correct recognition errors, adapt to the system, or see the immediate results of an editing command. Most on-line tablets capture writing as a sequence of coordinate points.

Handwriting recognition is complicated in part, because there are many different ways of generating the same character. For example, the four lines of the letter E can be drawn in any order. Handwriting tablets must also take into account character blending and merging, which is similar to the continuous speech problem. In other words, blending and merging make it difficult for a recognition system to determine where one character ends and the next one begins (or in the case of speech recognition systems, where one word ends and the next one begins). In addition, different characters can look quite similar and are, therefore, difficult to distinguish. Thus, prior to performing the character recognition, handwriting tablets pre-process the characters. Pre-processing typically involves properly spacing the characters and filtering out noise from the tablet. The more complicated processing occurs during actual character recognition.

Some character recognition processes, using binary decision trees, prune possible characters by identifying features. Normally simple features are identified first, such as searching for the dots above the letters "i" and "j". Features based on both static and dynamic features can be used for character recognition. Other character recognition processes involve the creation of zones, which define the directions a pen point can travel (usually eight), and define each character in terms of a set of zones. Look-up tables or dictionaries can be used to classify or identify the characters based on their features or sets of zones.

Another character recognition scheme relies on signal processing, in which curves from unknown forms are matched against prototype characters. They are matched as functions of time or as Fourier coefficients To reduce errors, elastic matching schemes (stretching and bending drawn curves) may be used. However, these methods are computationally intensive and, therefore, tend to be slow and expensive.

Most handwriting examination tablets reveal that recognition of dynamic features of characters is possible, as in speech. However, for the reasons discussed above, it is easier to recognize isolated characters than strings of characters. In most systems, the lag-time in recognition is typically about a second, and recognition rates are not very high. Reported rates of 95% are achieved only for very carefully formed writing.

Most handwriting examination tablets reveal that recognition of dynamic features of characters is possible, as in speech. However, for the reasons discussed above, it is easier to recognize isolated characters than strings of characters. Most systems lag recognition by about a second, and recognition rates are not very high. Reported rates of 95% are achieved only for very carefully formed writing.

For each of the types of recognition systems discussed above, a sample input (i.e. a voice or signature sample) must be processed and compared with a stored reference gesture in order to verify the identity of the subject. Normally, the reference gestures are located on a remote server and accessed by telephone lines or the Internet. The sample input must be sent to the remote server where it is compared to the reference gesture. Such a procedure is obviously exposed to the risk of security breaches. Furthermore, there is a cost associated with the maintenance of a remote server, and processing is delayed by the need to access the server. Accordingly, it is an object of the present invention to provide a quick and secure on-site method of identification, which is accurate and cost effective.

SUMMARY OF THE INVENTION

According to the present invention there is provided a method, and an apparatus for carrying out the method, for verifying a subject's identity using signatures or other biometrics. The first step of the method comprises recording a reference signature. The reference signature may be recorded by, for example, measuring two-dimensional space coordinates x and y exerted by a writer's writing instrument on a recording medium.

An indicium is selected from the coordinates that identifies a specific portion (the reference biometric) of the reference signature having a selected characteristic, which characteristic will be used for comparison with an unknown signature. The reference biometric and the indicium are then placed on a portable, machine-readable substrate, such as the magnetic strip on a credit card.

The indicium of the reference signature is read from the readable substrate and the coordinates of an unknown signature are collected. The indicium is used to locate the portion (the extracted biometric) of the unknown signature that corresponds to the reference biometric. Once identified, the extracted biometric is compared to the reference biometric to determine if they match within predetermined threshold criteria.

If the reference and extracted biometrics match, the identity of the provider of the unknown signature is positively established as being the same as that of the provider of the reference signature (or in other words, the bearer of the credit card). If the reference and extracted biometrics do not match, or if no portion of the unknown signature matches the characteristics of the indicium, the identity of the provider of the unknown signature is not verified.

The foregoing steps are done on-site, without the need to access a server or to send information over telephone lines or the Internet.

Advantageously, a second indicium may be stored on the portable, readable substrate and used in the event that no identifiable portion of the unknown signature corresponds to the first indicium, or the results of the first comparison using the first indicium indicate there is no match. In the preferred embodiment the portable, readable substrate is in the form of a magnetic strip, however, it will be appreciated by those skilled in the art that it may take any of a number of alternative forms.

The present invention additionally relates to an apparatus for implementing the above method.

The coordinates of the reference and unknown signatures that are recorded and measured may additionally include time, t, and force, z, among others.

It is obvious to anyone skilled in the art that the present invention can be adapted to verify identity by applying the method of the present invention to reference and unknown samples of voice, fingerprints, or other biometrics.

BRIEF DESCRIPTION OF THE DRAWINGS

Further features and advantages will be apparent from the following detailed description, given by way of example, of a preferred embodiment taken in conjunction with the accompanying drawings, wherein.

DETAILED DESCRIPTION WITH REFERENCE TO THE DRAWINGS

Figure 1:
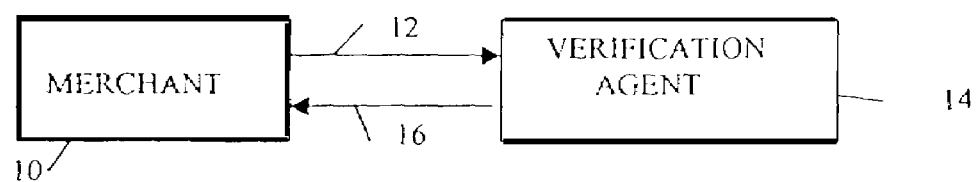
FIG. 1 is a schematic diagram of a typical credit card transaction.

Prior to evaluating an unknown signature, a reference signature must first be recorded and evaluated. The reference signature may be evaluated based on both local features and global features. Local features are those that occur within a localized region of a signature, for example, local maxima and minima, loops, points of intersection, points of zero velocity, etc. Global features are those that occur throughout the signature as a whole, for example, total signature time, average velocity of signature, length-to width ratio, etc.

If we assign the values x, y, z and t such that x is the horizontal displacement, y is the vertical displacement, z is the pressure, and t is time, then individual points of a signature can be represented by (x, y, z, t). One can normalize the values of x, y, and z in order to compensate for variations in signature sizes and recording device sizes.

Next, a selected biometric feature, in this case a local maximum, and a series of points on either side of that feature are recorded for comparison purposes. Also recorded is an indicium, which identifies the location of the local maximum, or other selected biometric feature. For example, the indicium may be the number of local maxima or points of zero velocity preceding the selected local maximum. The signatures of different individuals vary greatly and, therefore, depending on the nature of the reference signature some indicia may be more reliable than others. Therefore, it may be advisable to first test one indicium to see if it effectively identifies the selected local maximum. If not, another indicium can be chosen.

Signatures are not written in precisely the same way every time. Therefore, a given indicium may not correctly identify the selected local maximum in every instance. Accordingly, it may be advisable to use two or more indicia in parallel or to use a back-up indicium that is used in the event the first one fails.

A reference biometric, comprising the selected local maximum, which is chosen from within the reference signature, and coordinates x, y, z, and time, t, over a given range on either side of the selected local maximum are encrypted and recorded on a portable, machine-readable substrate such as the magnetic strip on the back of a credit or identity card. The indicium, which will be used to locate the corresponding local maximum within the unknown signature, is also recorded and encrypted on the magnetic strip.

When the identity of an unknown user is being verified, the card is swiped through a card reader and the indicium and reference biometric are extracted and stored locally in memory. Next the user signs his name (the unknown signature) on a touchpad, which records the coordinates of the unknown signature so they can be stored locally. Suitable touchpads have been developed by DSI Datotech Systems Inc. of Vancouver, British Columbia. The unknown signature is first normalized to correspond with the scale of the reference signature. By reference to the indicium, the extracted biometric is identified and extracted from within the unknown signature. The extracted biometric comprises a range of values of x, y, z, and t, corresponding to the reference biometric, and falling within a range determined by the indicium. The coordinates of the extracted biometric from the unknown signature are compared with those of the reference biometric. If the difference between the y values of the extracted biometric and the y values of the reference biometric are within a threshold value, then the x, z and t values will also be compared to determine if they fall within predetermined thresholds. If the x, y, z and t values all fall within the allowable thresholds, the extracted biometric and the reference biometric, and therefore the unknown signature and the reference signature, are matched. However, if the x, y, z and/or t values do not fall within the allowable thresholds, then there is no match. In such instances a new indicium and/or biometric feature may be selected and the process repeated. Alternatively, for increased reliability, comparison of a global biometric, such as velocity, may also be made.

Figure 2:
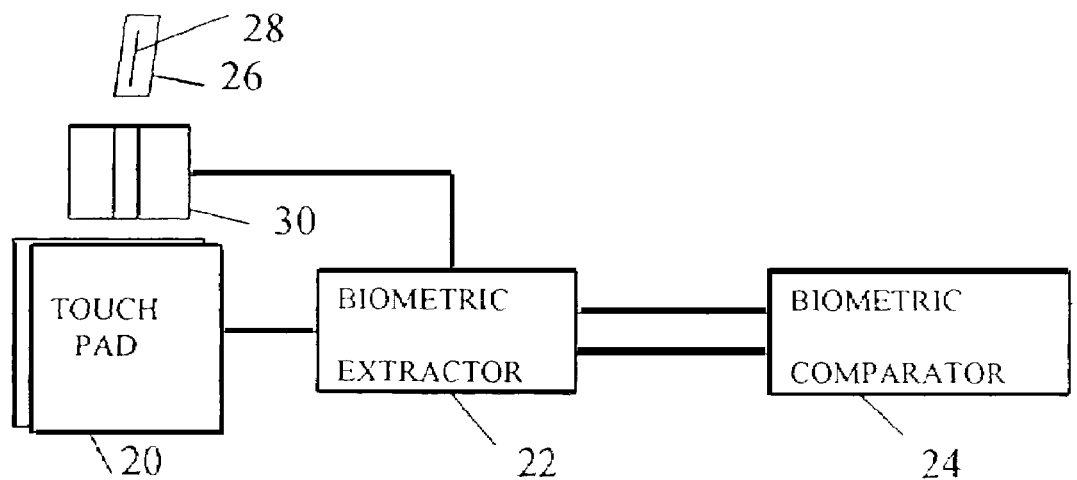
FIG. 2 is a schematic diagram of the identification scheme.

Referring to FIG. 2, the identification verification system of the present invention consists of a credit card or identity card 26, on the back of which is a magnetic strip 28 containing a reference biometric and indicium. The credit card 26 is swiped through a first input device, in this case a credit card swiper unit 30.

Gesture input device 20, which can be a touch pad, receives the unknown signature and extracts position, velocity, acceleration and force information from the unknown signature. The gesture input device 20 and the card swiper unit 30 are connected to the biometric extractor 22. Rather than having to store the large amount of information that would be represented by the average signature, the unknown signature is analyzed and only a small portion, the extracted biometric, (which is identified by the indicium, received from the card swiper 30) is extracted by the biometric extractor 22.

Although not shown in FIG. 2, the card swiper unit 30 may also be coupled to the biometric comparator 24 so that the reference biometric may be sent directly rather than passing through the biometric extractor 22.

The extracted biometric of the unknown signature is transmitted to the biometric comparator 24, which also receives the reference biometric that is stored on a magnetic strip 28 on the back of a credit card or identity card 26, which has been swiped through a credit card swiper unit 30. Biometric comparator 24 compares the extracted biometric with the reference biometric from the card 26. If the comparison by the biometric comparator 24 results in a match, then the person providing the unknown signature is the same person that provided the reference biometric. The accuracy of the technique is not 100% so it may be prudent to use one or more additional biometrics or portions of a signature for comparison in parallel to determine, with an adequate level of confidence, whether there is a match. Alternatively, the identity verification procedure can be repeated.

The biometric extractor 22 and biometric comparator 24 may be incorporated into a CPU (not shown) and the results displayed on a monitor (not shown).

Any one of several conventional statistical analyses can be used determine whether there is a match between the extracted biometric and the reference biometric, such as a calculation of the average of the square of the differences between the coordinates of the extracted biometric and the reference biometric.

Figure 3:
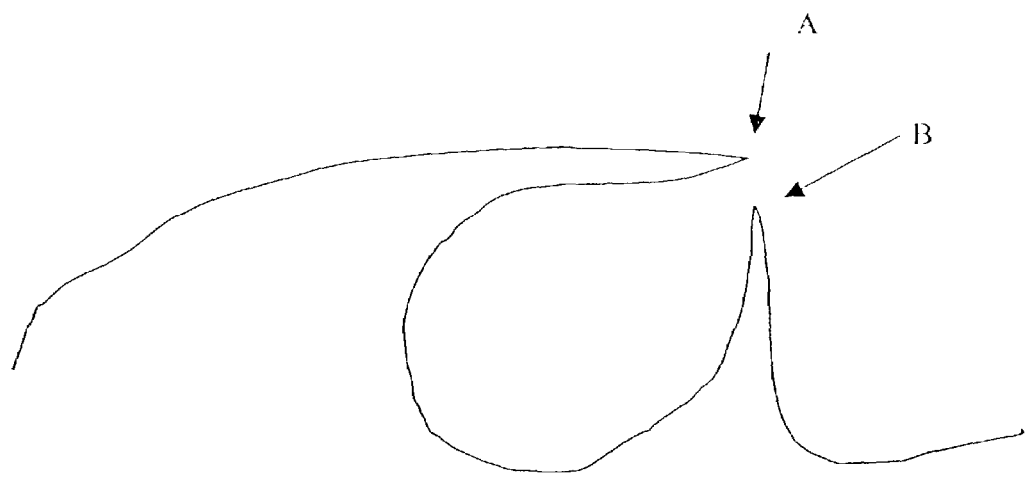
FIG. 3 is a diagram of a handwritten letter "a" showing points A and B of zero velocity.
Figure 4:
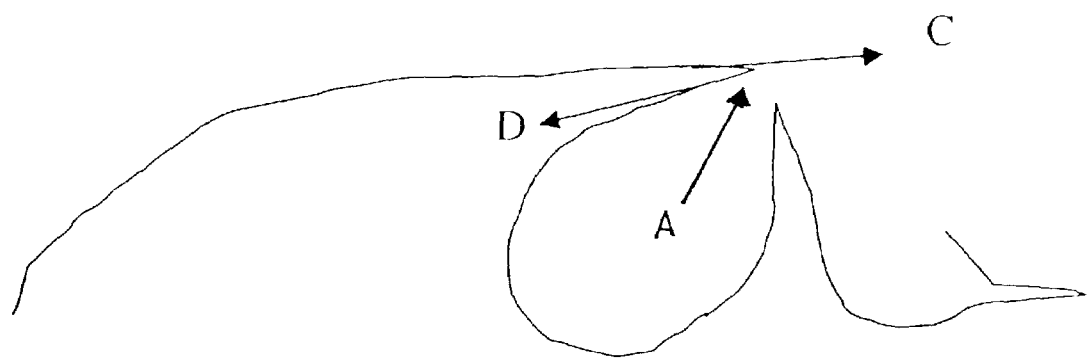
FIG. 4 is a diagram of a handwritten letter "a" showing entry vector C and exit vector D of a point of zero velocity.

An alternative method of comparing reference and extracted biometrics comprises a vector analysis surrounding points of zero velocity. In a typical signature, there are likely a plurality of points where the velocity of the pen is zero. For example, referring to FIG. 3, points A and B of the letter "a" will be points of zero velocity. Referring to FIG. 4, point A will have two position vectors surrounding that point, a vector C entering the point A and a vector D exiting from the point A. Therefore, using these three pieces of data, a given point where the pen velocity is zero will have $(x_1, y_1, z_1)$ indicating the point of zero velocity, $(x_2, y_2, z_2)$ indicating the entry vector, and $(X_3, y_3, z_3)$ indicating the exit vector. Therefore, a given point of zero velocity, identified by indicia as discussed above, can be used as a reference biometric to verify the identity of the person providing an unknown signature, by comparing the point of zero velocity, and the associated entry and exit vectors with the corresponding point of zero velocity and vectors of a reference signature.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

I claim:

1. A method for verifying a person's identity comprising the steps of:
   (a) inputting into a computer a reference signature of the person;
   (b) identifying at least one first signature portion of the reference signature input at Step (a), the first signature portion being less than the whole reference signature and including a first feature;
   (c) identifying at least one indicium for each first signature portion identified at Step (b), whereby each indicium points to the position of its respective first signature portion in the reference signature;
   (d) recording each first signature portion identified in Step (b) and its respective indicium identified at Step (c) on a portable machine readable substrate, whereby the first signature portions and their respective indicia are sufficient to determine whether an unknown signature matches the reference signature of Step (a) within predetermined threshold criteria without the entire reference signature being recorded on the substrate;
   (e) inputting into a computer the first signature portions and their respective indicia recorded on the machine-readable substrate of Step (d);
   (f) inputting into a computer an unknown signature;
   (g) using each indicium input at Step (e) to point to a respective second signature portion of the unknown signature input at Step (f); and,
   (h) for each second signature portion pointed to in Step (g) determining whether a second feature exists within the second signature portion wherein the second feature matches the first feature of Step (b) within the predetermined threshold criteria of Step (d).

2. A method according to claim 1, wherein the reference signature and the unknown signature are handwritten signatures.

3. A method according to claim 1 wherein Steps (f)-(h) are done on-site without accessing a server and without sending information over telephone lines or the Internet.

4. A method according to claim 1, wherein the first signature portion of Step (b) and the second signature portion of Step (g) are identified by at least one of: i) two-dimensional space coordinates, ii) a force coordinate, and iii) a time coordinate.

5. A method according to claim 1, wherein pressure sensitive pads are used to input the reference signature at Step (a) and the unknown signature at Step (f).

6. A method according to claim 1, wherein the machine-readable substrate of Step (d) is a magnetic strip.

7. A method according to claim 6, wherein the magnetic strip is on a credit card.

8. A method according to claim 1, wherein Step (b) comprises identifying at least two first signature portions of the reference signature.

9. A method according to claim 1, wherein Step (c) comprises identifying at least two indicia for each first signature portion, whereby if one indicium fails to locate the unknown portion in the unknown signature, at least one additional indicium will if the unknown portion is present.

10. A method according to claim 9 further comprising the step of using at least a second one the indicia identified at Step (c) to point to the unknown portion in Step (g) in the event that the determination of Step (h) based on a first indicium is that the second feature does not match the first feature within the predetermined threshold criteria.

11. A method according to claim 1, wherein the unknown signature is normalized prior to identification of the unknown portion.

12. An apparatus for verifying a person's identity, said apparatus comprising:
 a. a portable machine readable substrate on which is recorded i) at least one reference portion of a reference signature of the person, and ii) at least one indicium, wherein the reference portion is less than a whole of the reference signature, the recording of the whole of the reference signature on the substrate not being required, and wherein the indicium points to or identifies; the reference portion within the reference signature, and;
 b. a first input device operative to read the reference portion and the indicium from said machine readable substrate;
 c. a biometric input device operative to receive an unknown signature;
 d. a biometric extraction unit coupled to said first input device and said biometric input device, said biometric extraction unit operative to identify and extract an unknown portion within the unknown signature that is pointed to by the indicium; and,
 e. a biometric comparator coupled to said biometric extraction unit, said biometric comparator operative to receive the unknown portion and the reference portion, said biometric comparator additionally operative to compare the unknown portion and the reference portion to determine if they match within predetermined threshold criteria.

13. The apparatus according to claim 12 wherein said portable machine readable substrate is a magnetic strip.

14. The apparatus according to claim 13 wherein said magnetic strip is on a credit card.

15. The apparatus according to claim 12 wherein said biometric input device is a pressure sensitive pad.

16. The apparatus according to claim 12 wherein two-dimensional space coordinates x and y, a force coordinate z, and a time coordinate t of the reference portion are recorded on said portable machine readable substrate.

17. The apparatus according to claim 12 wherein the reference signature and the unknown signature are handwritten signatures.

* * * * *